April 5, 1927.
N. P. SWARTZ
BRAKE
Filed Oct. 16, 1924
1,623,817
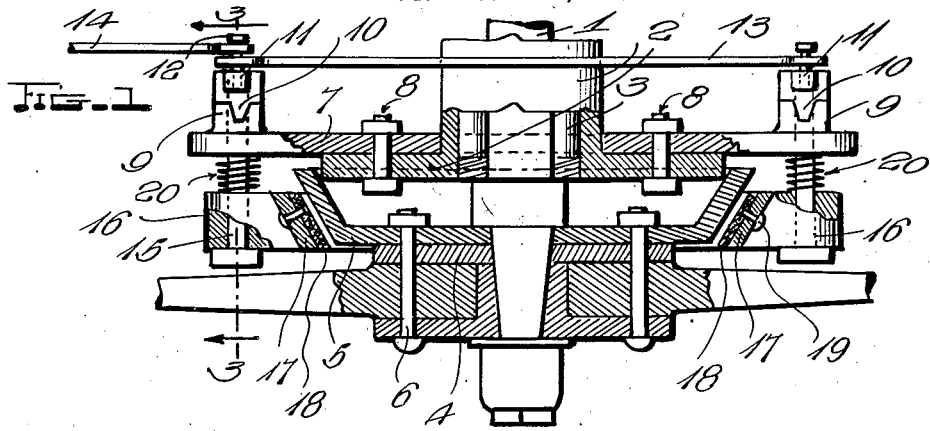
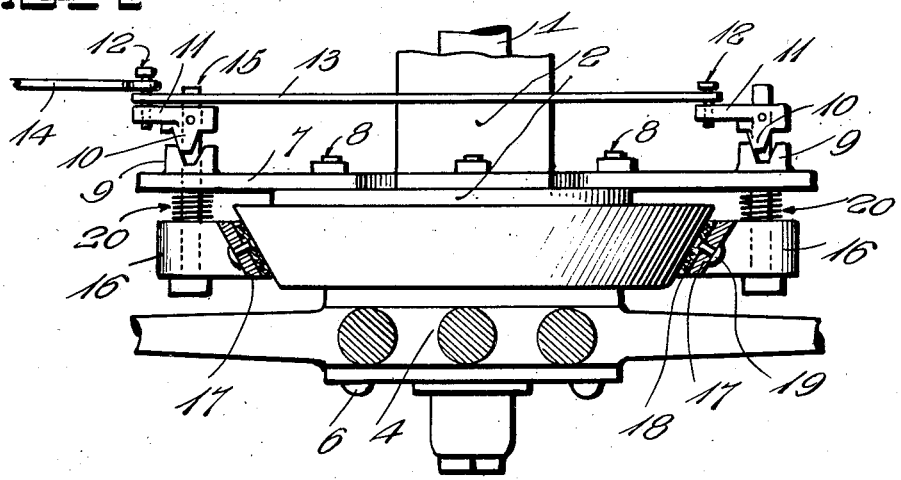
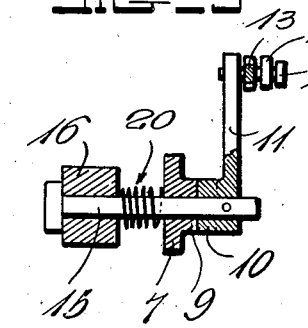
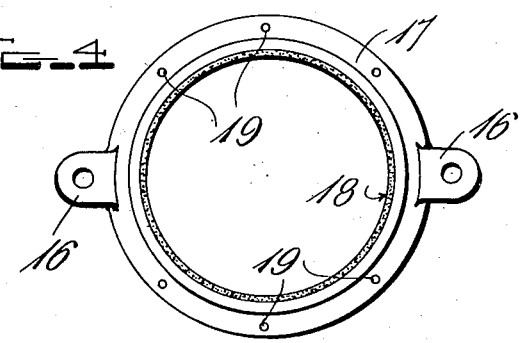
INVENTOR.
Niles P. Swartz
BY James J. Sheehy
ATTORNEYS Patented Apr. 5, 1927.

1,623,817

UNITED STATES PATENT OFFICE.

NILES P. SWARTZ, OF DALTON, PENNSYLVANIA.

BRAKE.

Application filed October 16, 1924. Serial No. 744,067.

My present invention pertains to braking mechanism for motor vehicles and the like and it contemplates the provision of a simple and effective brake construction that is easily operated and applied and will immediately stop the movement of the vehicle with the exertion of but a slight amount of effort on the part of those practicing my invention.

The invention further contemplates the provision of a brake drum or plate that may be used either exteriorly or interiorly with respect to the brake drum or may be used exteriorly and interiorly at one and the same time; the exterior braking arrangement being for use in connection with the foot of the operator and the interior construction being used as an emergency or hand brake.

The invention in all of its details will be fully understood from the following description and claim when the same are read in connection with the drawings accompanying and forming part of this specification, in which;

Figure 1 is a view partly in horizontal section showing my novel brake mechanism as applied to the hub of a motor vehicle and further showing the brake as off, illustrating clearly the large amount of clearance between the brake drum and the braking band.

Figure 2 is a similar view showing the brakes as applied.

Figure 3 is a detail view taken in the plane indicated by the line 3—3 of Figure 1 and looking in the direction of the arrow.

Figure 4 is a detail view of the brake ring.

My novel braking mechanism is used by preference on the rear wheels of a motor vehicle although it may be secured on the front wheels or if desired on all four wheels of a vehicle. The ordinary axle 1 having the casing 2 and the roller bearing 3 are of the well known construction as is also the wheel proper 4 and secured, preferably to the hub or adjacent thereto, as illustrated, I provide a cone-shaped plate or drum 5 that has the outwardly directed walls as illustrated and this cone is bolted to the wheel by means of the members 6, while the housing 2 is provided with the integral portion that forms a flange that rests on the cone 5 and secured to the flange are bars 7 that extend around the axle casing and are bolted to the flange by the members 8. The bars 7 have the notched lugs 9 that coact with the noses 10 of the arms 11 while bolts 12 pass through the arms 11 as well as through the ends of the connector rod 13 that extends from one of the arms 11 to the other arm 11. Secured on the bolts 12 are connector or pull rods 14 that tend to turn the arms 11 by manipulation of the connector rod 13.

Adapted to travel over the cone or band 5 and to apply pressure thereto is a brake plate 17 having the ears 16 and these ears are so constructed that bolts 15 pass therethrough and these bolts 15 further pass through the inner ends of the arms 11 as clearly shown in Figure 3 while arranged on the inner face of the band or cone 17 is brake lining 18 fastened at 19 while interposed between the ears 16 of the cone 17 and the ends of the bars 7 are springs 20.

In the practical operation of the invention forward pull or that exerted in the direction of the arrow 3 of Figure 1 on the pull rod 14 will cause the arm 11 to move the nose 10 in the notch lugs 9 of the bars 7. This will pull the bolts 15 upwardly and place the springs 20 under pressure and at the same time the brake or plate 19 will firmly grip the cone or conical shaped disk 5 thereby precluding momentum of the wheel in the direction of its travel. Removal of the pressure by releasing the pull rod will immediately return the cone or band 17 to its inoperative position Figure 1.

Manifestly the locking or effectual braking of the wheel is easily accomplished and it will be seen that any tendency of a wheel to pull off of the axle will immediately apply the band 17 to the conical drum or plate 5. This is an extremely important feature when it is apparent that any tendency of the wheel to become disengaged from the axle will be stopped not only in its outward movement but in its rotation.

The invention is extremely simple in construction and I do not wish to be confined to the means for putting the brake on or releasing same from the drum nor do I wish to be confined as to the arrangement of the brake 17 inside or outside of the drum or inside and outside at the same time as it is apparent that with slight changes the construction may be duplicated interiorly of the drum.

Having described my invention, what I claim and desire to secure by Letters Patent, is:—

In brake mechanism, the combination of an axle having a casing and roller bearings as well as a wheel secured thereon, a cone-shaped plate secured on the hub of the wheel, an integral portion formed on the casing and providing a flange that rests on the cone-shaped plate, a bar secured to the flange; said bar adapted to extend around the axle, notched lugs formed on the bar, arms having noses adapted to seat in the notches of the lugs, bolts adapted to pass through the arms, a connector rod extending from the arms, a pull rod secured to one of the bolts and adapted to turn the arms, a brake plate adapted to exert pressure on the cone-shaped plate and having ears thereon, bolts adapted to pass through the ears and through the inner ends of the arms, linings arranged in the brake and springs surrounding the last named bolts and interposed between the ears of the brake and the ends of the first named bar.

In testimony whereof I have hereunto set my hand.

NILES P. SWARTZ.